May 22, 1934.  J. BRODE ET AL  1,959,898
PRODUCTION OF PHTHALIC ANHYDRIDE
Original Filed Aug. 14, 1929
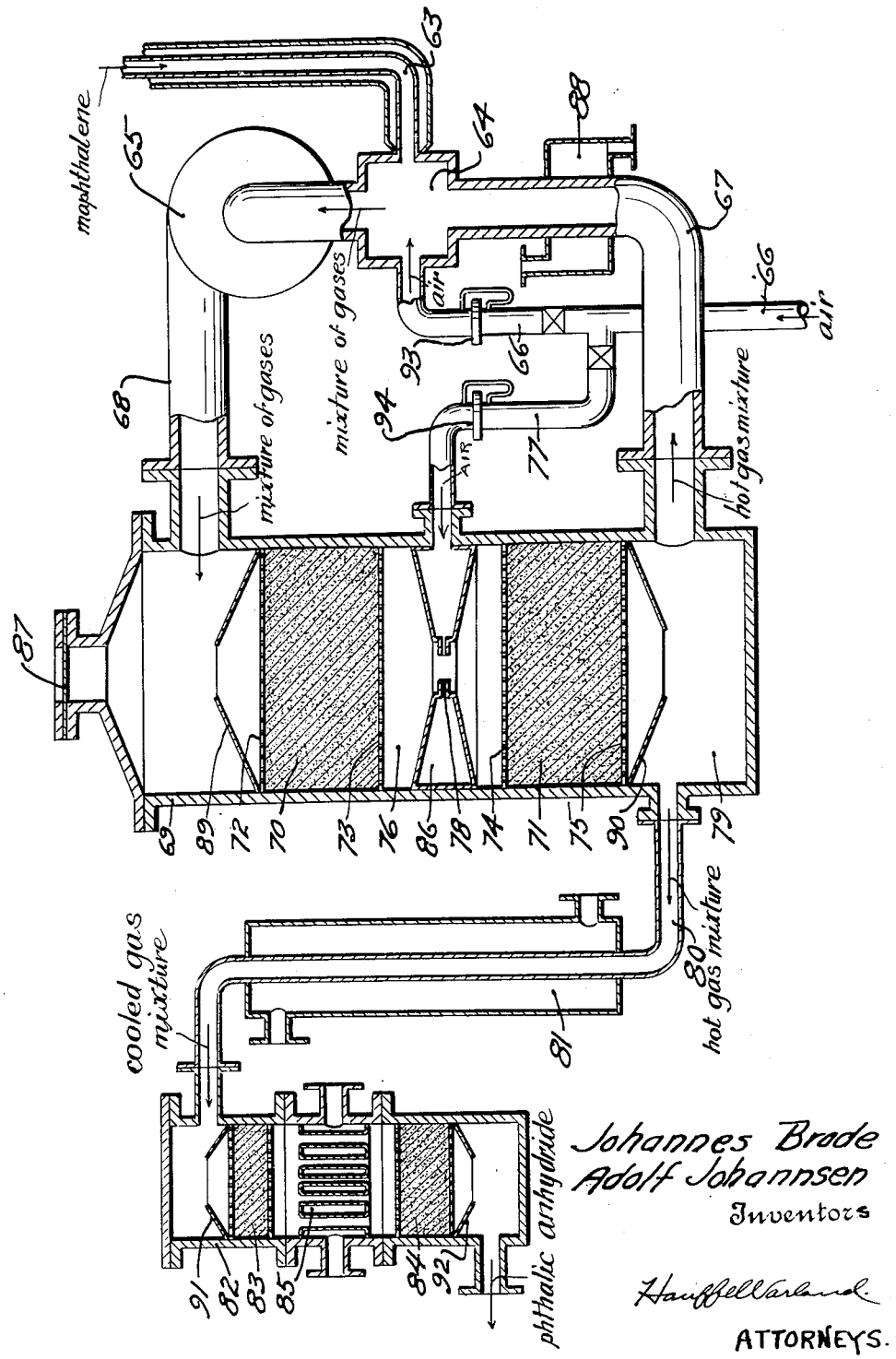
Johannes Brode
Adolf Johannsen
Inventors
ATTORNEYS.

Patented May 22, 1934

1,959,898

UNITED STATES PATENT OFFICE 1,959,898

PRODUCTION OF PHTHALIC ANHYDRIDE

Johannes Brode, deceased, late of Ludwigshafen-on-the-Rhine, by Käthe Brode, administratrix, Ludwigshafen - on - the - Rhine, and Adolf Johannsen, Mannheim, Germany, assignors to I. G. Farbenindustrie Aktiengesellschaft, Frankfort-on-the-Main, Germany Original application August 14, 1929, Serial No. 385,857. Divided and this application January 28, 1931, Serial No. 511,720. In Germany June 2, 1925

3 Claims. (Cl. 23—288)

The present invention relates to the catalytic oxidation of naphthalene to phthalic anhydride.

According to our invention, the catalytic oxidation of naphthalene to phthalic anhydride may be carried out without any substantial cooling of the catalyst by working with highly diluted gas mixtures. While a strong dilution of the initial gas for example by additional air is not economical because the recovery of the phthalic anhydride from the large volume of gases would be extremely difficult, we have now found that a very advantageous method of carrying out the said reaction without the necessity of cooling the catalyst is the following one. We dilute the initial gas mixture containing about 35 grams of naphthalene per cubic meter of air with a large volume of gases having already undergone the reaction and from which reaction products have not yet been separated. When working in this manner and especially when using the catalysts described and claimed in the copending application for patent by Gustav Schneider, Ser. No. 385,959, filed August 14, 1929, there is practically no further oxidation of the phthalic anhydride contained in the gas mixture serving as the diluent. We prefer to dilute the initial gas mixture with about from 6 to 7 times its volume of gas mixture having undergone the reaction so that the gas mixture which is then admitted into a simple vessel filled with the catalyst, contains only about from 4 to 5 grams of naphthalene per each cubic meter of gas measured at 15° C. and 735 millimeters pressure.

Simultaneously the content of the gas mixture having undergone the reaction in heat is utilized for heating the freshly introduced naphthalene air mixture, which need be preheated only so far as to maintain the naphthalene in the vapor state, to the temperature at which reaction sets in, that is about 350° C. The resulting reaction mixture which is comparatively poor in naphthalene is heated by the reaction only by about 50° to 60° C. The aforesaid principle will be further explained with reference to the accompanying drawing, which represents diagrammatically a vertical section through an apparatus suitable for carrying out this process according to our invention.

Referring to the drawing in detail, the naphthalene is introduced either in the liquid state or in the form of a highly concentrated naphthalene air mixture, the concentration of which is above the explosion limit, by means of a steam heated tube 63 into a chamber 64 connected with a blower 65. Air is introduced by means of a tube 66 into said chamber 64 and is mixed with the naphthalene. The said blower 65 simultaneously sucks in by means of the tube 67 hot gas mixture which has undergone the reaction, and which is mixed with the air and naphthalene introduced into the chamber 64. The resulting mixture of gas is introduced by means of a tube 68 into the top of a vessel 69 containing two layers of catalyst 70 and 71 between sieve plates 72, 73, 74 and 75. While the gas mixture passes through the catalyst 70, part of the naphthalene is oxidized. The hot gas mixture is next collected in a chamber 76 in which it is mixed with further amounts of air introduced from the pipe 66 through a pipe 77 and the nozzles 78. The gas mixture is next passed through the catalyst 71, where further oxidation takes place, and is then collected in a chamber 79 from which a substantial portion of it is introduced by means of the pipe 67 into the chamber 64 and the blower 65. A comparatively small portion of the gases leaving the catalyst is led away through a tube 80 provided with a cooler 81 whereby the temperature of the gas is slightly reduced and is then introduced into a further catalyst vessel 82 serving for the conversion of the remainders of naphthalene and of the alpha-naphthoquinone present in the gas mixture. The said catalyst apparatus 82 contains two layers of catalyst 83 and 84, between which is arranged a cooling device or heat-exchanger 85, by which means the temperature can be controlled more reliably than by the arrangement of baffle plates. It may be advantageous to employ for the catalyst 84 one of higher activity than the catalyst 83.

Referring more particularly to the introduction of air by means of the pipe 77 and the nozzles 78, the air is introduced into an annular chamber 86 provided with a conical bottom and cover, from which chamber the air is uniformly supplied to the nozzles 78.

The apparatus 69 is provided at its top with an explosion plate 87. That part of the gas mixture leaving the catalyst which is reintroduced into circulation may be cooled in the pipe 67 by means of a cooler 88. In order to ensure proper distribution of the gases throughout the several catalyst layers, the vessel 69 is provided with the conical plates 89 and 90 and the vessel 82 with the conical plates 91 and 92. The amounts of air admitted by the tubes 66 and 77 are measured by means of the throttles 93 and 94. The arrangement shown in Figure 7 has the following advantages: The air required for reaction can be introduced without being preheated by a suitable preheater or by heat exchange with the reaction gases. The cooling action of the air can be utilized at two entirely different places of the circulatory system. The proportion of air introduced into the system to naphthalene can be smaller since there are no mixtures of air and naphthalene alone and the lower explosion limit of the mixtures of phthalic anhydride and naphthalene with air and the remaining gases such as carbon dioxide, nitrogen and water vapor is higher than that of mixtures consisting only of naphthalene vapor and air. The smaller amount of air required involves an easier separation of the phthalic anhydride from the reaction gases. Further the concentration of naphthalene in the circulating gas mixture may be higher since the air introduced by way of the chamber 86 prevents the temperature from increasing too far. Thereby a smaller amount of gases having undergone the reaction is to be circulated and the work of the blower 65 smaller.

When suitably constructing the elements of the aforedescribed apparatus the process may also be carried out under elevated pressure.

The present application has been divided out from our copending application Ser. No. 385,857, filed August 14, 1929.

What we claim is:—

1. Apparatus for producing phthalic anhydride by the catalytic vapor phase oxidation of naphthalene, which comprises a catalyst chamber, means for supplying a mixture of naphthalene vapor and air thereto, means for collecting the gases leaving the catalyst chamber, means for mixing them with air, a second catalyst chamber through which the resulting gas mixture is passed, means for collecting the gases leaving said second chamber, means for mixing a substantial portion of these gases with the fresh naphthalene air mixture, and a further catalyst chamber, through which the remainder of said gases is passed.

2. Apparatus for producing phthalic anhydride by the catalytic vapor phase oxidation of naphthalene, which comprises a catalyst chamber, means for supplying a mixture of naphthalene vapor and air thereto comprising a mixing chamber, means for collecting the gases leaving the catalyst chamber, means for mixing them with air, a second catalyst chamber through which the resulting gas mixture is passed, means for collecting the gases leaving the second chamber, means for mixing a substantial portion of these gases with the fresh naphthalene air mixture comprising the aforesaid mixing chamber, and a further catalyst chamber through which the remainder of said gases is passed.

3. Apparatus for producing phthalic anhydride by the catalytic vapor phase oxidation of naphthalene, which comprises a vessel which is subdivided into two catalyst chambers connected in series, means for supplying a mixture of naphthalene vapor and air to the first of said catalyst chambers comprising a mixing chamber having separate inlets for the naphthalene and for air, means arranged between the two catalyst chambers for mixing the gases leaving the first chamber with more air, means for mixing a substantial portion of the gases leaving the second chamber with a fresh naphthalene air mixture, and a further catalyst chamber through which the remainder of said gases is passed, comprising two layers of catalyst between which is arranged a heat exchange device.

KÄTHE BRODE,
*Administratrix of Johannes Brode, Deceased.*
ADOLF JOHANNSEN.